United States Patent
Shaffer et al.

(10) Patent No.: US 6,553,232 B1
(45) Date of Patent: Apr. 22, 2003

(54) SYSTEM AND METHOD FOR CALENDAR-BASED CELLULAR SMART SWITCHING

(75) Inventors: Shmuel Shaffer, Palo Alto; William Joseph Beyda, Cupertino, both of CA (US)

(73) Assignee: Siemens Information & Communication Networks, Inc., Boca Raton, FL (US)

( * ) Notice: Subject to any disclaimer, the term of this patent is extended or adjusted under 35 U.S.C. 154(b) by 0 days.

(21) Appl. No.: 09/469,550

(22) Filed: Dec. 22, 1999

Related U.S. Application Data

(63) Continuation of application No. 08/778,525, filed on Jan. 3, 1997.

(51) Int. Cl.[7] ................................................ H04Q 7/20
(52) U.S. Cl. .................... 455/440; 455/443; 455/456
(58) Field of Search ................................ 455/436, 437, 455/438, 439, 456, 420, 440, 442, 443, 444, 445, 446

(56) References Cited

U.S. PATENT DOCUMENTS

| | | | |
|---|---|---|---|
| 4,597,105 A | 6/1986 | Freeburg | |
| 4,989,230 A | 1/1991 | Gillig et al. | |
| 5,018,187 A | 5/1991 | Marinho et al. | |

(List continued on next page.)

FOREIGN PATENT DOCUMENTS

| | | |
|---|---|---|
| EP | 0369535 | 5/1990 |
| EP | 0696118 A2 | 2/1996 |
| WO | WO 92/02105 | 2/1992 |
| WO | WO 96/13951 | 5/1996 |
| WO | WO 97/20423 * | 6/1997 ............ H04M/1/64 |

OTHER PUBLICATIONS

Liu and Maguire, Efficient Mobility Management Support for Wireless Data Services, IEEE, pp. 902–906, Jul. 25, 1995.

*Primary Examiner*—William Trost
*Assistant Examiner*—Tilahun Gesesse

(57) ABSTRACT

A user's access patterns are accounted for in deciding to switch between a plurality of wireless networks 204, 206. A method according to one embodiment of the present invention includes monitoring a location of a wireless communication device 202 within a region serviced by a first wireless communication network 204 and second region serviced by a second wireless communication network 206. The first and second region have an overlapping region which could be serviced by both networks. The future location of the wireless communication device 202 within the first and second regions is predicted based on the monitoring of the previous locations of the wireless communication device 202. When the wireless communication device 202 is detected as being within the overlapping region, the system determines whether to transfer an active connection between the wireless communication device 202 and one of the networks to the other network. In one embodiment, past patterns of usage of the wireless communication 202 device within the first and second region are identified and used to predict a future location based on the past pattern. In another embodiment, a calender of predetermined time-location associations is input into a controller 203 associated with the wireless communication device 202 and the prediction is based on an actual location and current time being compared with the values input into the calender.

11 Claims, 8 Drawing Sheets

U.S. PATENT DOCUMENTS

| | | | |
|---|---|---|---|
| 5,257,406 A | * 10/1993 | Ito | 455/56.1 |
| 5,263,177 A | 11/1993 | Schieve et al. | |
| 5,268,957 A | 12/1993 | Albrecht | |
| 5,329,578 A | 7/1994 | Brennan et al. | 379/67 |
| 5,333,266 A | 7/1994 | Boaz et al. | |
| 5,448,569 A | 9/1995 | Huang et al. | |
| 5,465,390 A | * 11/1995 | Cohen | 455/456 |
| 6,011,971 A | * 1/1996 | Jolma | 455/438 |
| 5,513,246 A | 4/1996 | Jonsson et al. | |
| 5,534,876 A | 7/1996 | Erickson et al. | |
| 5,550,907 A | 8/1996 | Carlsen | |
| 5,561,845 A | 10/1996 | Bendixen et al. | |
| 5,590,528 A | 1/1997 | Muszynski | |
| 5,594,781 A | * 1/1997 | Kozdon et al. | 379/60 |
| 5,734,709 A | 3/1998 | DeWitt et al. | |
| 5,752,191 A | 5/1998 | Fuller et al. | |
| 5,790,528 A | * 8/1998 | Muszynski | 455/436 |
| 5,802,468 A | * 9/1998 | Gallant et al. | 455/456 |
| 5,825,759 A | * 10/1998 | Liu | 370/331 |
| 5,875,395 A | * 2/1999 | Holmes | 455/420 |
| 5,875,400 A | * 2/1999 | Madhavapeddy et al. | 455/458 |
| 5,905,789 A | 5/1999 | Will | |
| 5,930,700 A | 7/1999 | Pepper et al. | |
| 6,014,564 A | * 1/2000 | Donis et al. | 455/436 |
| 6,125,278 A | * 9/2000 | Wieczorek et al. | 455/437 |

* cited by examiner

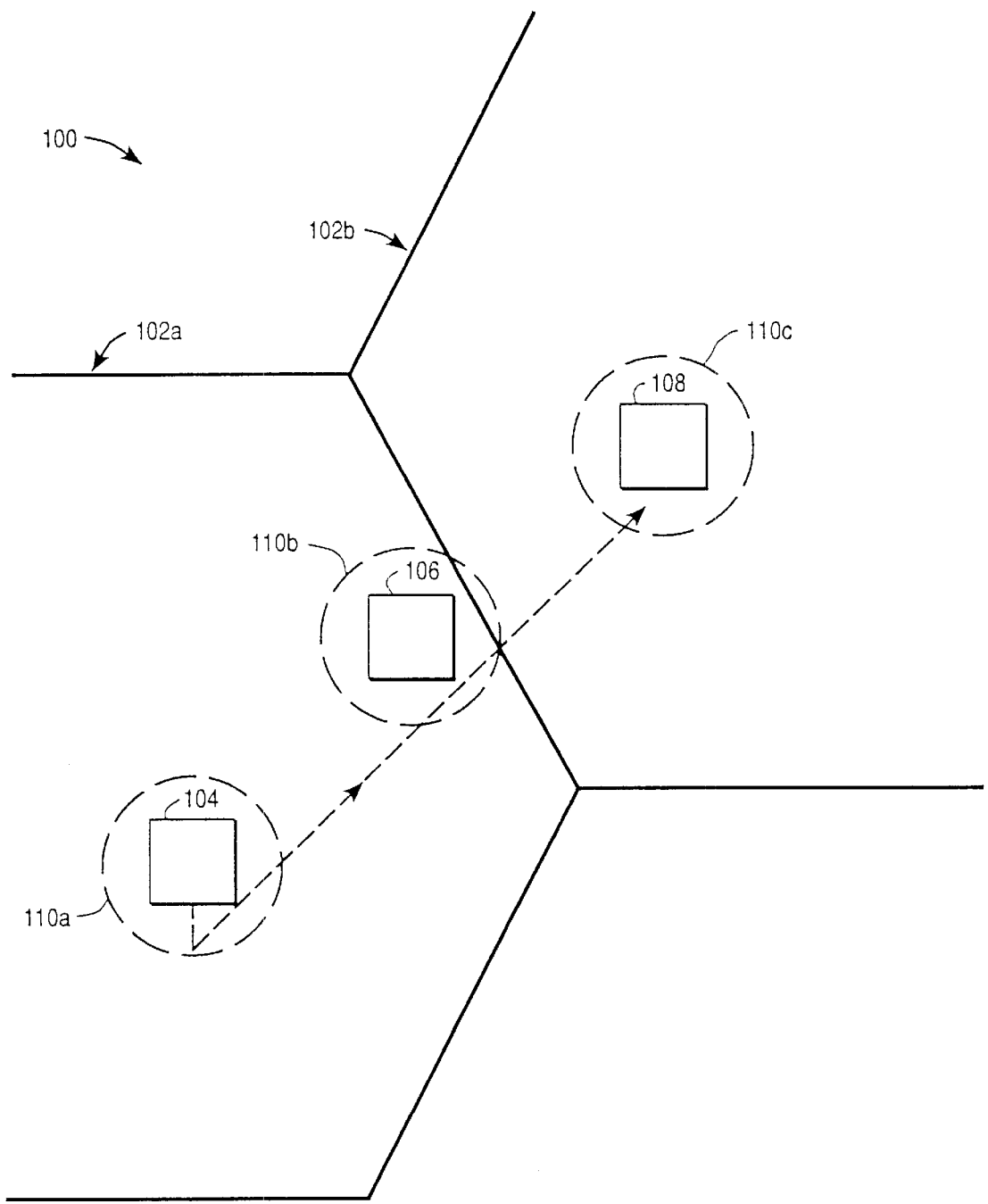
FIG_1

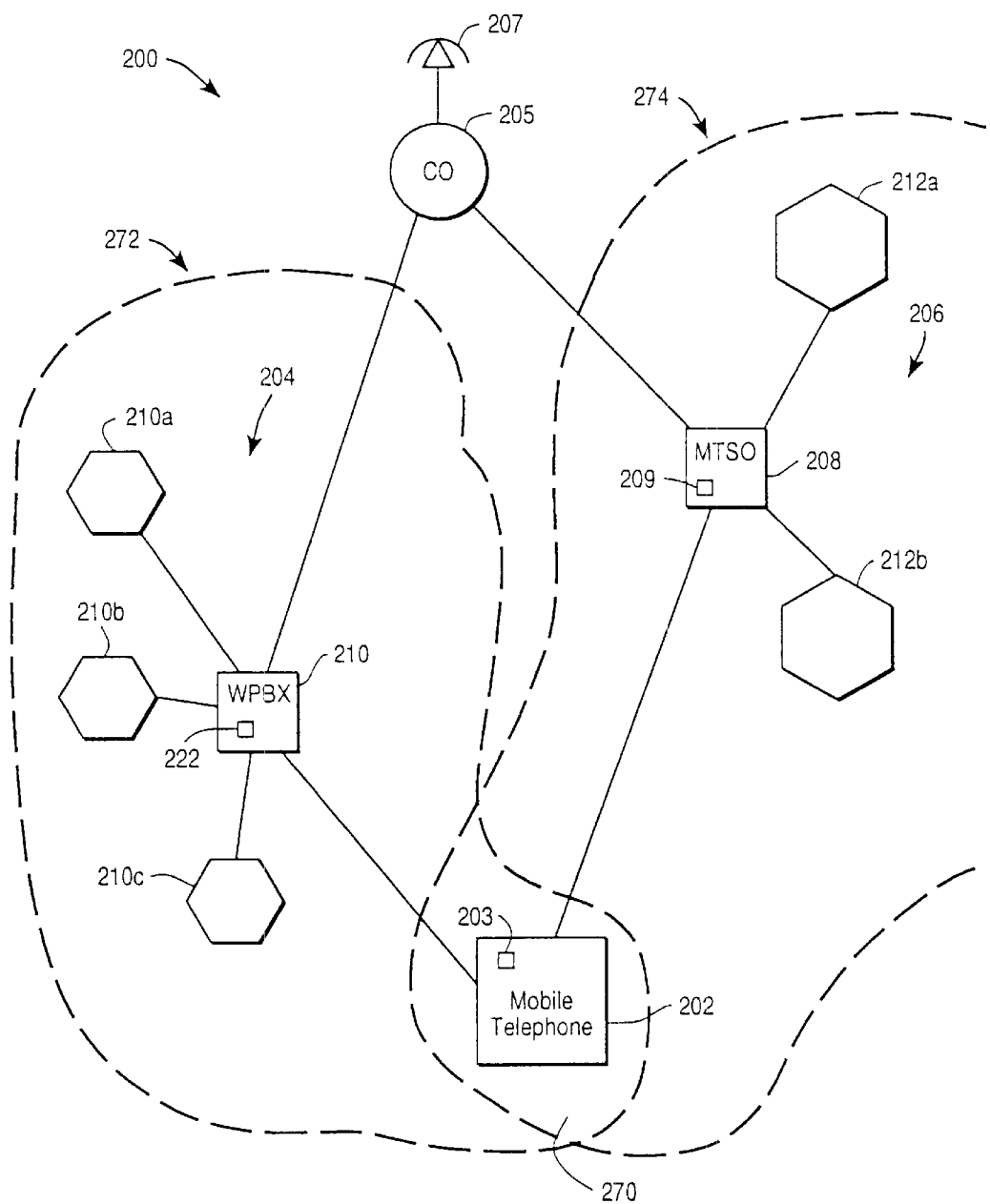
FIG_2

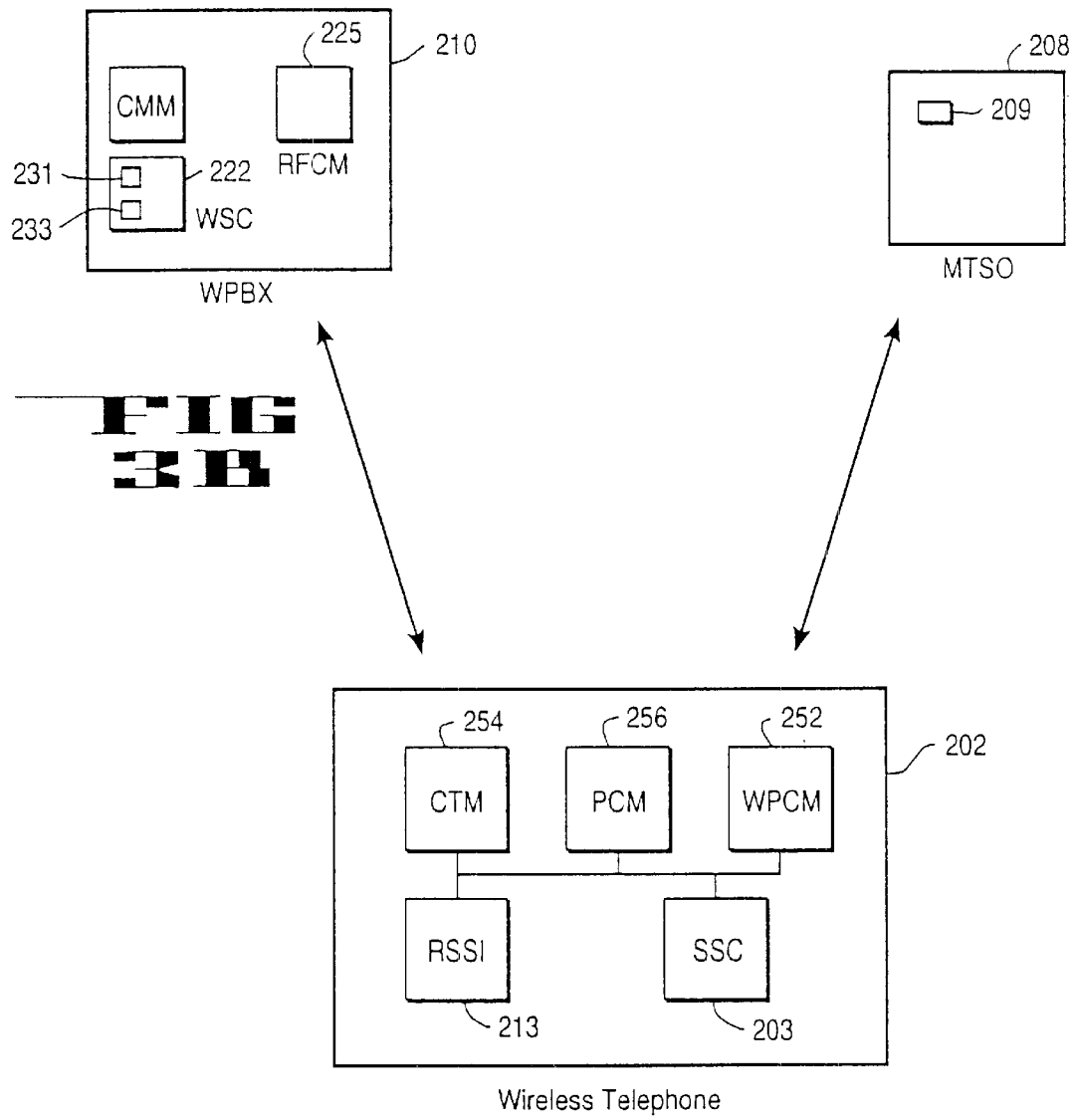

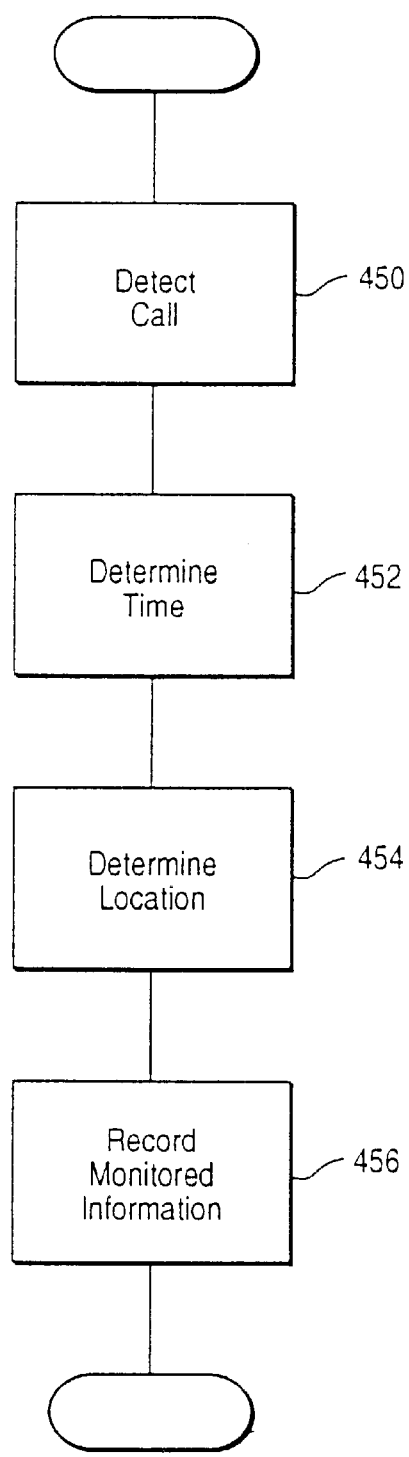
FIG_4

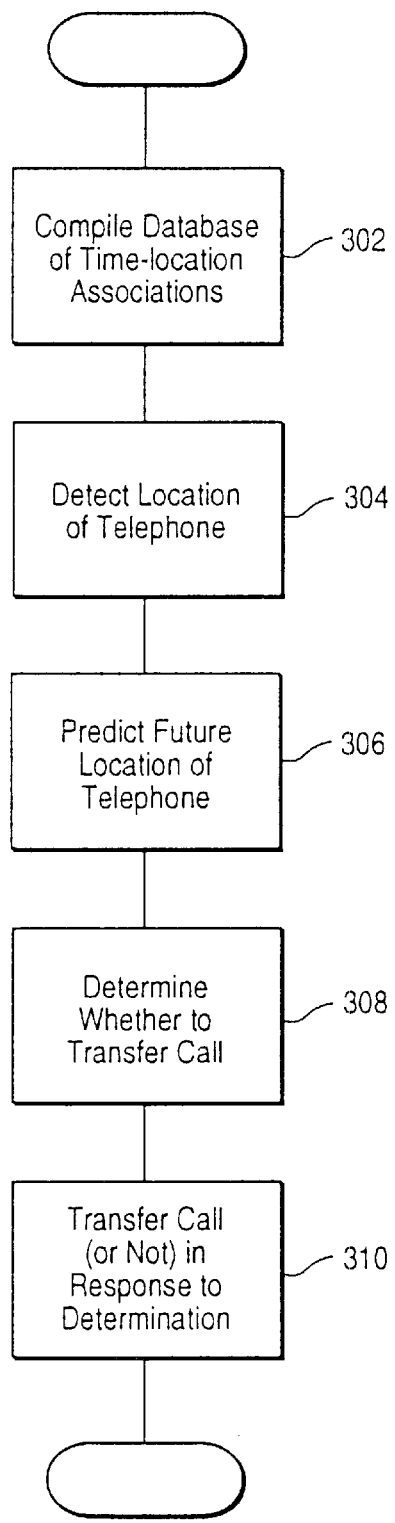
FIG_5

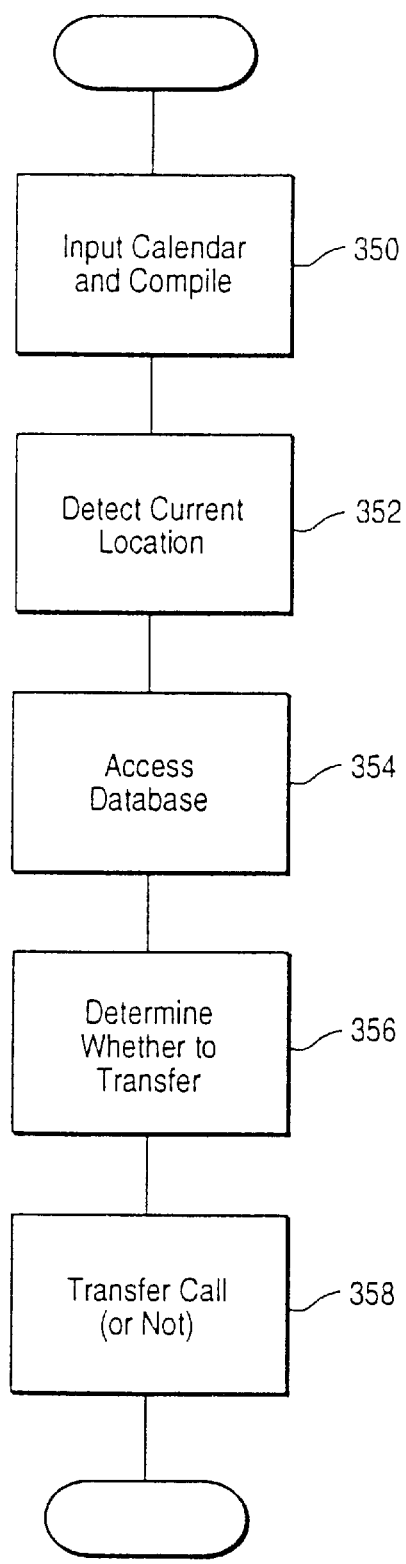
FIG_6

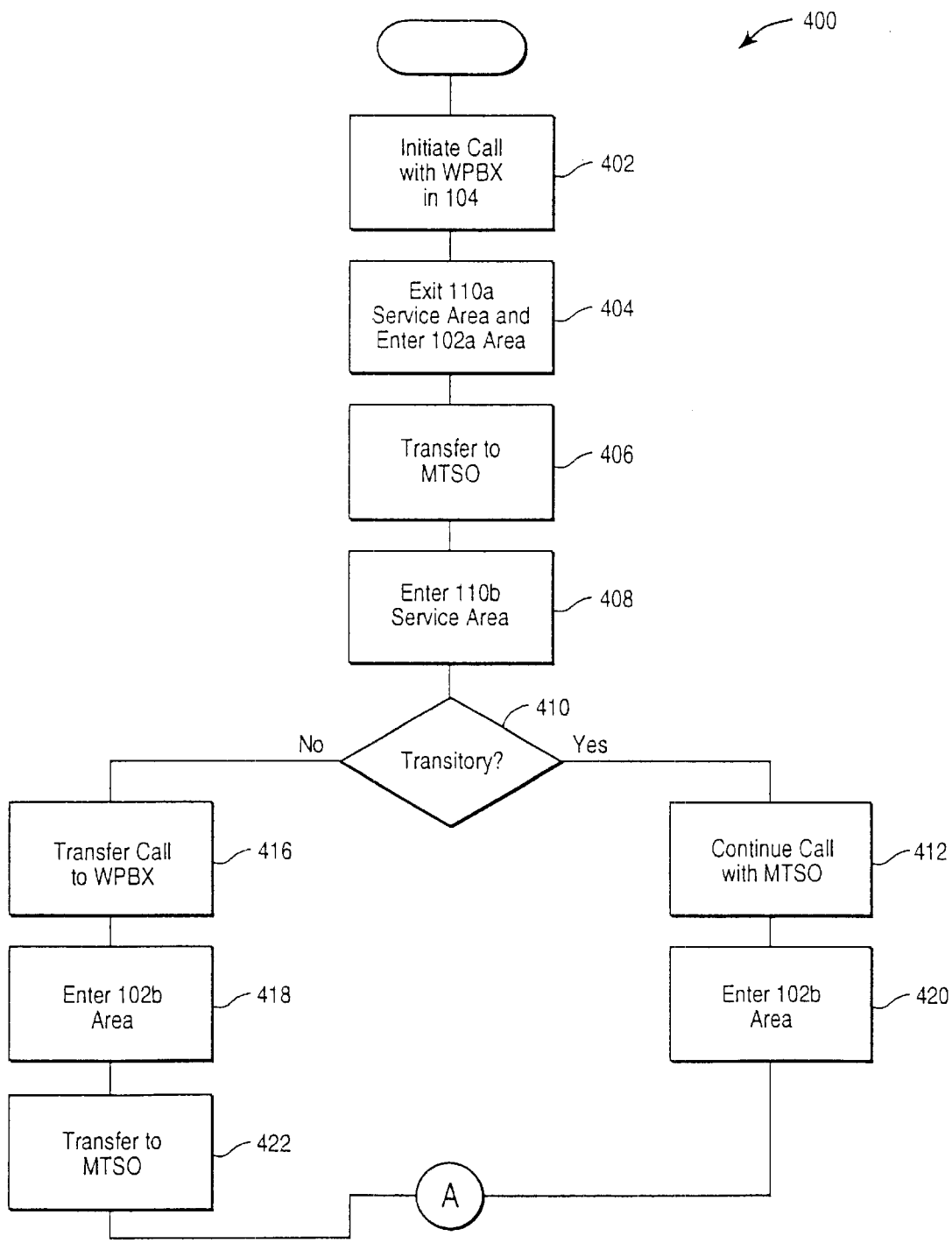
FIG_7A

SYSTEM AND METHOD FOR CALENDAR-BASED CELLULAR SMART SWITCHING

This is a continuation, of application Ser. No. 08/778,525 filed Jan. 3, 1997.

BACKGROUND OF THE INVENTION

1. Field of the Invention

The present invention relates to wireless communication systems and, more particularly, to an improved system and method for controlling hand-offs of calls from one wireless network to another.

2. Description of the Related Art

During a call connecting a wireless communication device, such as a cellular telephone, with another telephone, the wireless communication device may cross from the domain of one wireless network to an independent wireless network. Such networks may comprise a company's private cellular telephone network and the public cellular telephone network, for example. Thus, to complete the call, the wireless communication device must be capable of being used in both the company's internal wireless system and in the public system, and accommodation must be made for controlling hand-offs from one network to the other.

Hand-off of a telephone call from the domain of the first wireless network to the domain of the second wireless network may be made via a control link shared between central processing units of the two networks. Using the control link, the two wireless networks are able to negotiate feasibility and operations of hand-off as described, for example, in EIA/TIA interim standard IS42.2-B, "Cellular Radio Telecommunications Intersystem Operations: Intersystem Hand-Off," which is hereby incorporated by reference. While, ideally, hand-offs from one network to another are imperceptible to the user, in practice, hand-offs frequently introduce extraneous clicks and temporary loss of signal.

Frequently a user of the wireless communication device is required to travel from one company site to one or more other company sites, which can cause the wireless communication device to repeatedly switch back and forth between the public and private systems. This can cause unnecessary hand-offs, particularly since typical systems assume that a private wireless system, free of call charges, is preferable to a public system, even though the public systems typically charge a per call access fee. In such systems, a hand-off is always made to the private system, whether or not it is the most efficient in terms of cost or signal quality.

This situation is illustrated more clearly with regard to FIG. 1. In FIG. 1, an exemplary two-network wireless communication system 100 is shown. A private company wireless system is installed in buildings 104, 106 and 108. As illustrated, each building 104, 106, 108 is associated with its own cell or service area 110a, 110b, and 110c, respectively. Overlapping the private wireless system is a public wireless system 102 having multiple cells, only two of which, 102a and 102b, are shown.

As illustrated by the dashed line in FIG. 1, a user can travel from building 104 to building 108, crossing through cell areas 110a, 102a, 110b, 102b and 110c. Assuming that the user begins executing a telephone call in building 104, the user's call will be serviced by the private wireless network so long as he is within region 110a. As soon as the user leaves region 110a, he will be transferred to the public wireless carrier (so long as he is in region 102a). As the user approaches the vicinity of building 106, he will re-enter into the service area of the private wireless network as represented by cell 110b. His call will then be transferred back to the private network. As soon as the user leaves the area surrounding building 106, his call will be transferred from the private network to the public wireless network as he enters region 102b. Finally, as he approaches building 108, his call will be transferred back to the private network as enters region 110c.

By the time the user gets to building 108, he has been transferred four times, each time with a momentary loss of conversation, a change in signal quality and, with every transfer to the public wireless carrier, a new charge per call. Accordingly, a system and apparatus is desired which minimizes the number of unnecessary hand-offs between private and public wireless networks so as to minimize charges and enhance the quality of the call.

SUMMARY OF THE INVENTION

The above described problems are overcome in large part by a system and method according to the present invention in which a user's access patterns are accounted for in deciding to switch between the private and public wireless networks. A system and method according to one embodiment of the present invention includes monitoring a location of a wireless communication device within a plurality of regions serviced by a plurality of wireless systems, e.g., a first region serviced by a first wireless communication system and a second region serviced by a second wireless communication system. The first and second regions have an overlapping region which could be serviced by both networks. The system predicts the future location of the wireless communication device within the first and second regions based on the monitoring of the previous locations of the wireless communication device. When the wireless communication device is detected as being within the overlapping region, the system determines whether to transfer an active connection between the wireless communication device and one of the networks to the other network based on the monitoring information.

In one embodiment, past patterns of usage of the wireless communication device within the first and second regions are identified and used to predict a future location based on the past pattern. In another embodiment, a calender of predetermined time-location associations is input into a controller associated with the wireless communication device, and the prediction is based on an actual location and current time being compared with the values input into the calender.

A method according to another embodiment of the invention comprises compiling a database of time-location associations of a wireless communication device within a first region serviced by a first wireless communication system and a second region serviced by a second wireless communication system. The first region and second regions have a predetermined overlapping region. The method further comprises detecting when the wireless communication device is present within the overlapping region during an active connection and predicting a future location of the wireless communication device within the first region or the second region during the active connection. Finally, the method comprises determining whether to transfer the active connection between the wireless communication device and the first or second wireless communication systems to the other when the wireless communication device is detected as being within the overlapping region.

A wireless telecommunication system according to an embodiment of the present invention comprises a first wireless network providing service over a first predetermined region and comprising a first switching office, and a second wireless telephone network providing service over a second predetermined region and comprising a second switching office. The first predetermined region and the second predetermined region overlap in a third predetermined region. A wireless communication device is configured for use in both networks. The second switching office comprises a memory unit configured to store a database of time-location associations related to a presence of the communication device in either the first predetermined region or the second predetermined region. The second switching office also includes a wireless switching control unit coupled to the database, and configured to access the database when the communication device is detected within the third predetermined region and to transfer an active call between the networks based on the time-location associations.

BRIEF DESCRIPTION OF THE DRAWINGS

A better understanding of the present invention is obtained when the following detailed description is considered in conjunction with the following drawings in which:

FIG. 1 is a diagram illustrating an exemplary two network wireless system and the movement of a user therein;

FIG. 2 is a block diagram of a wireless network system according to an embodiment of the present invention;

FIG. 3 is a more detailed block diagram of a wireless communication device and interface between two wireless networks according to an embodiment of the present invention;

FIG. 4 is a flowchart illustrating monitoring of time and location usage patterns; and FIGS. 5–7 are flowcharts illustrating operation of various embodiments of the present invention.

DETAILED DESCRIPTION OF THE INVENTION

FIG. 2—Wireless Network System

Figure 7B:
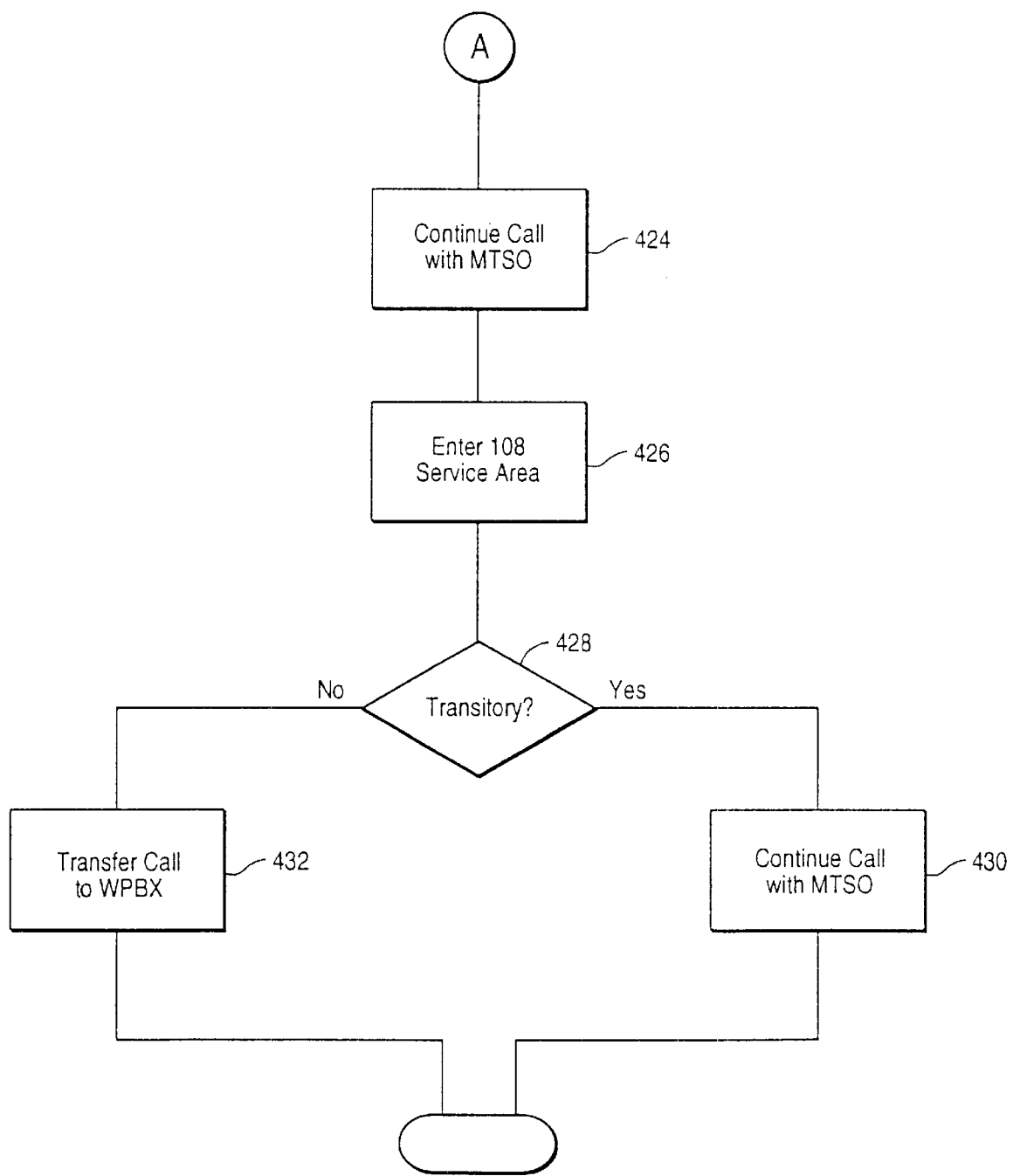

Turning now to FIG. 2, a diagram illustrating the interaction of a wireless communication device 202, a stationary telephone 207, and two wireless systems 204, 206 is illustrated. The system and method of the present invention can be used to facilitate the interaction of one or more wireless communication devices 202 and a plurality of wireless systems or networks. In FIGS. 1–7, the present invention is described with reference to private wireless network 204 and public wireless network 206. As used herein, "wireless communication device" refers to any wireless communication device or wireless telephone, including, for example, pagers, cellular telephones, PCS devices, and other wireless messaging, voice, and data communication devices.

The system 200 includes a private wireless network 204 and a public wireless network 206. Wireless networks 204 and 206 are exemplary of cellular communication device networks or PCS networks of various types. Private wireless network 204 includes a wireless private branch exchange 210 which provides central switching functions to a plurality of cells 210a, 210b, and 210c. Each cell 210a, 210b, and 210c includes an antenna for receiving signals from a wireless communication device and associated equipment, referred to as a base station (not shown), for transmitting the received signals to the wireless private branch exchange 210. Wireless private branch exchange 210, in turn, is coupled to a central office 205 representative of, for example, a central office for coupling calls to the public switched telephone network. Wireless private branch exchange 210 further includes a wireless switching control unit 222 configured to record use patterns and store a database relating thereto according to the present invention. Wireless switching control unit 222 includes a processing unit and a memory device to facilitate these functions, as will be described in greater detail below.

Public wireless network 206 includes one or more wireless communication device switching offices 208 (MTSO), or PCS switching offices, which provide switching functions to a plurality of cells 212a and 212b. Each MTSO 208 includes a communications controller 209 for supervising communications within and external to the network. Again, each cell 212a, 212b includes a base station having an antenna for receiving signals from wireless communication devices: and associated equipment for transmitting the signals to the MTSO 208. MTSO 208 is coupled to central office 205 (which may be a different central office than the one to which the private wireless network 204 is coupled).

Wireless communication device 202 is configured for use in either the private wireless network 204 or the public wireless network 206. Wireless communication device 202 may thus be configured to receive, transmit and process signals according to various frequencies and/or coding standards and/or modulation formats of the varying public and private wireless networks. Exemplary protocols include time division multiple access (TDMA) and code division multiple access (CDMA) protocols. Wireless communication device 202 may also include a smart switching controller 203 configured to perform control operations relating to switching call connections on wireless communication device 202 between private wireless network 204 or public wireless network 206, as will be discussed in greater detail below.

To make a call, the wireless communication device must be registered as a user in the respective network. This is accomplished, for instance, by the communication device and the wireless private branch exchange exchanging control signals. Once the registration occurs, a call from wireless communication device 202 within private wireless network 204 is transmitted to an antenna (not shown) in a cell 210a, 210b, 210c and from the antenna to the wireless private branch exchange 210. A connection is then made from the wireless private branch exchange 210 to either another wireless private branch exchange or to the central office 205. From the central office 205, the connection is made to the public switched telephone network.

Similarly, prior to making a call on public cellular network 206, an exchange of control signals is performed between the wireless communication device 202 and an MTSO 208 of the network. Once this occurs, calls via the public cellular network 206 are made from wireless communication device 202 to an antenna (not shown), within the respective cell, which transmits the signal to the MTSO 208. The MTSO 208 in turn provides the connection to the central office 205 which connects to the public switched telephone network.

As will be discussed in greater detail below, wireless switching control unit 222 is configured to supervise the switching of calls between the two networks based on time-location associations.

FIG. 3—Block Diagram

Turning now to FIG. 3, a more detailed block diagram of the wireless systems illustrating various components of one embodiment of the present invention is shown. Components which are common to FIG. 2 retain the same reference numerals.

FIG. 3A illustrates wireless communication device 202. Wireless communication device 202 may include a smart switching control unit (SSC) 203 configured to supervise (in conjunction with the relevant switching exchanges) transfers of active telephone calls from one network to another, based on time-location associations, as will be discussed in greater detail below. Smart switching control unit 203 may comprise a variety of circuits, including microprocessor or micro controllers, or application specific integrated circuits (ASIC).

Wireless communication device 202 further includes a wireless private branch exchange communications module (WPCM) 252, a connection transfer module (CTM) 254, a PCS communications module (PCM) 256, and an RF signal strength indicator module 213 (RSSI). Each of the various modules may be comprised in microprocessor or micro controller chips, or in application specific integrated circuits (ASICs). WPCM 252 is used to supervise communications between the telephone 202 and the wireless private branch exchange 210. PCM 256 is similarly used to supervise communications between the wireless communication device 202 and the MTSO or PCS switch 208. CTM 254 supervises the switching of calls between cells within a particular network, and between the networks, as will be described in greater detail below. RSSI 213 is used for recognizing the need to make a transfer of a call from, for example, WPBX 210 because of signal fade, which occurs when the caller has gone past a boundary of the region serviced by the private wireless network 204.

Turning now to FIG. 3B, wireless private branch exchange 210 is illustrated. Wireless private branch exchange 210 includes a call management module (CMM) 223, an RF communications module (RFCM) 225, and a wireless switching control unit (WSC) 222. CMM 223 is used for managing the various telephony functions or services associated with the call, such as call transfer, conference call, and the like. RFCM 225 includes an RF transceiver (not shown) and supervises the registration and call set-up of the wireless communication device, as well as the handover or hand-off from one cell to another, and to other networks. WSC 222 is used to supervise the inter-network switching management functions based on time-location associations according to the present invention. More particularly, WSC 222 includes a processor or other control unit 231 and a memory 233 for storing a database of information which is used to predict a user's patterns of usage. In one embodiment, the database comprises a record of past usages monitored by the processor 231 of the WSC 222. In another embodiment, the database comprises a user-input calendar of future time-location associations. The processor 231 aboard WSC 222 further monitors the location of the wireless communication device 202 when a call is made or received. The processor 231 accesses the database 233 and predicts a future location of the wireless communication device 202 to determine whether to switch from one network to another. It is noted that, while illustrated as a discrete unit, WSC 222 can be comprised within RFCM, or as a unit external to the WPB3X 210. Thus, FIG. 3 is exemplary only. In addition, it is noted that, while the system preferably operates according to software, hardware implementations are contemplated.

A description of the operation of the RSSI 213 is deemed appropriate. When the wireless communication device's RSSI 213 detects that signal strength has fallen below a predetermined threshold, RSSI 213 communicates with the WPCM 252 to cause the WPCM 252 to attempt to make a handover to another antenna (i.e., within an adjacent cell) having a suitably strong signal. If the WPCM 252 cannot make a handover to an antenna within the private wireless network 204, it sends a signal to CTM 254. In response, CTM 254 transmits a signal to PCM 256 to attempt to find another system to which it can transfer the connection.

PCM 256 includes controls and apparatus for registering the wireless communication device as a valid user of the public wireless network 206. "Registration" refers to a method of verifying that the wireless communication device handset can communicate with a wireless network. This is accomplished with respect to public wireless network 206 by the wireless communication device 202 exchanging radio signals with the public wireless network 206 which are designed to establish status as a valid user. The exchange of radio signals takes place in accordance with protocols which are well known to those of skill in the art, for example, according to EIA/TIA interim standard "IS-54B Cellular System Dual Mode Mobile Station—Base Station Compatibility Standard." If the registration is successful, PCM 256 sends a signal indicating that condition to CTM 254. CTM 254 in turn provides the connection (i.e., transfers the call between the networks).

According to the present invention, call transfers are made based on the time-location associations independent of the signal strength determination. Call transfers based on the time-location associations are similar to call transfers based on the signal strength determination. When the wireless communication device 202 enters within range of both networks, and a call is in progress, the processor 231 of the WSC 222 identifies whether the user will be repeatedly entering and exiting the region serviced by, for example, the private wireless network. This identification occurs through the processor 231 of the WSC 222 accessing a database in memory 233 in which user time-location associations are stored. In one embodiment, the time-location associations comprise a record based on the processor 231 monitoring the past usage of the wireless communication device 202. The locations can comprise, for example, the individual cells of the network. Time associations can be either based on duration within the cell and time-of-day associations, where applicable. In another embodiment, the database time-location associations comprise a calendar manually input by the user of his or her predicted schedule. In still another embodiment, the database comprises a combination of a user-input calendar and the monitored record.

Assume, for example, that a call is in progress on the public cellular network 206, and the user enters a region serviced by the private network 204. The WPBX 222 learns of the presence of the wireless communication device, for example, via a signal from the wireless communication device 202, i.e., from the exchange of control signals described above. If, after accessing the database in memory 233, the processor 231 of WSC 222 determines that the user will not, in fact, be repeatedly entering and exiting the region serviced by the private network, the WSC 222 signals the SSC 203 of the wireless communication device 202. The wireless communication device 202 allows the CTM 254 to effectuate a transfer from the public wireless network to the private wireless network. The PCM 256 informs the MTSO 208 of the public network 206 to release the call, and it is switched to the private network 204. It is noted that while supervision of this functionality on the wireless communication device end has been described with regard to the SSC 203, this functionality may be incorporated into the various other modules of the wireless communication device. It is similarly noted that while RSSI 213 and SSC 203 are illustrated as discrete units, in alternative embodiments, they may be integrated into a single unit. If the processor 231 of the WSC 222 determines that the user will be repeatedly entering and exiting the region serviced by the private network, the WSC 222 either does nothing, or provides a control signal indicating that the wireless communication device is to continue being serviced by the public wireless network.

In another embodiment, the time-location associations comprise a record of cells and transit patterns relating to durations of time required to cross through the cells. The stored transit patterns may result from monitoring past usages, as described above, or a calendar input by the user, again, as described above. Thus, if a user has an active connection in the public network, and enters and remains within a cell of the private network for longer than a predetermined period, the system will switch to the private network. If the user stays within the cell for less than the predetermined period, however, the connection will remain with the public network.

For example, if the user has an active connection on the public network, his or her entry into a cell serviced by the private network will be detected, such as by the above-described registration process. The processor 231 accesses the database of time-location associations, which include a record of how long it takes to transit through the cell. If the user remains within the cell for longer than the determined period, the call connection will be transferred, as described above.

FIG. 4—Flowchart of One Embodiment of Processor Monitoring

Turning now to FIG. 4, a flowchart illustrating the monitoring operation according to one embodiment of the invention is shown. Initially, a call involving wireless communication device 202 is detected (Step 450) and processed, for example, by the wireless private branch exchange 210. The call may be either a received call or one initiated by the wireless communication device 202. As discussed above, call processing includes the exchange of various control signals between the telephone's WPCM 252 and the wireless private branch exchange's CMM 223 and RFCM 225.

The processor 231 detects the servicing of the call and determines the time of the call (Step 452). In addition, the processor 231 determines the location of the wireless communication device 202 (Step 454) at the time of servicing the call. This may comprise, for example, the processor 231 monitoring present cell location and cell switching operations as controlled from the wireless private branch exchange. Alternatively, SSC 203 may provide control time-location information directly to the wireless private branch exchange. The processor 231 then stores the times and locations in memory 233, and later compiles it into a usable database (Step 456). It is noted that, in one embodiment, the monitoring of the wireless communication device's (and hence user's) location, may be disabled. It is similarly noted that, in an alternate embodiment, constant monitoring of the wireless communication device's location (even when there is no active call), for example, by the SSC 203 (or other functional modules of the wireless communication device) registering within each cell, or providing information within a global positioning system (GPS), is contemplated. Finally, the monitoring of the usage patterns may further comprise monitoring the duration of time the user spends within a cell.

FIG. 5—Flowchart of Operation of One Embodiment of the Present Invention

Turning now to FIG. 5, a flowchart illustrating operation of an embodiment of the present invention is shown. Time-location associations of the wireless communication device are stored and compiled by the processor 231 as a database in the memory device 233 coupled to or within WSC 222 (step 302). For example, the location of the wireless communication device within the public network or the private network may be monitored by the processor 231 over time. The usage patterns of the wireless communication device (i.e., whether the wireless communication device is activated and registered as a user in a particular cell of one or the other of the networks) are monitored. Alternatively, and to provide a more accurate record of the user's actual schedule, so long as the wireless communication device is ON, the SSC 203 may be configured to provide a signal to the WSC 222 identifying the user's location within particular cells. The usage patterns may further comprise a record of the user's duration of time within a particular cell (i.e., how long it takes the user to transit through a cell).

Next, when the user initiates an active connection on the wireless communication device, the system detects the location of the device making the call (step 304). In addition to being used to manage the call, this information is used in order to determine whether the device's presence within a region serviced by the private network or the public network is transitory (i.e., whether the user will be repeatedly entering and re-entering one or the other of the networks). The processor 231 in the WSC 222 accesses its database and predicts what the user's usage is likely to be (Step 306). As noted above, this may comprise determining how long it should take for the user to transit through the particular cell.

Based on the present time and user location, and the result of the accessed time-location associations from the database, the processor 231 determines whether to transfer the call (Step 308). This may comprise, for example, the processor 231 waiting a predetermined period for the user to transit a cell. Finally, if the processor 231 determines that a transfer is necessary, the appropriate control signals are issued which effectuate the transfer from the one network to another (Step 310). For example, if the call is presently being serviced by the public network, and a determination is made to transfer the call, the WSC 222 sends a signal to the WPCM 252 (for example), which in turn, signals the CTM 254 to initiate a transfer from the public network 206.

It is noted that the system preferably continually updates the database. Thus, a user's usage patterns that are inconsistent with the previously stored and compiled database record are periodically incorporated into an updated database, to more optimally predict a future location.

FIG. 6—Flowchart of Alternate Embodiment

Turning now to FIG. 6, a flowchart illustrating operation of an alternate embodiment of the present invention is shown. In the illustrated embodiment, rather than monitoring past usage patterns, the system allows the user to input his schedule, according to time and location (Step 350). This may further comprise the user entering estimates of his or her transit times through particular cells. Thus, the user determines what his schedule is likely to be during, for example, the coming week. He or she then records this information, for example, on a computer diskette, and uploads the information to the WPBX 210. Alternatively, provision may be made for the user to input this information directly from the wireless communication device 202. The WSC 222 stores the information within the memory 233 and compiles a database.

Once the database has been compiled, the system is ready for use. Next, when the user initiates an active connection on the wireless communication device, the system (preferably processor 231) detects the location of the device making the call (step 352). In addition to being used to manage the call, this information is used in order to determine whether the device's presence within a region serviced by the private network or the public network is transitory (i.e., whether the user will be repeatedly entering and re-entering a region serviced by one or the other of the networks). The processor 231 of WSC 222 accesses its memory 233 for the database (Step 354) and determines whether to transfer the call, by predicting what the user's future usage pattern is likely to be (Step 356). This may comprise waiting a predetermined period for the user to exit the cell. Finally, depending upon the outcome if the determination in Step 356, the call is transferred (Step 356).

For example, if the call is presently being serviced by the public network, and a determination is made to transfer the call, the WSC 222 sends a signal to the WPCM 252 (for example), which in turn, signals the CTM 254 to initiate a transfer from the public network 206. It is noted that the calendar operation described with regard to this embodiment may also be incorporated into the embodiment described above with respect to FIG. 5. Thus, for example, both the user's schedule and his actual access patterns may be used to determine whether a call should be transferred from one network to the other.

FIG. 7—Flowchart of Exemplary Operation of Present Invention

Turning now to FIG. 7, a flowchart 400 illustrating an exemplary operation of the present invention is shown. Flowchart 400 illustrates the call processing procedure for a user traveling as illustrated in FIG. 1. For example, the user initiates a call within building 104 serviced by cell 110*a* of the private wireless network 204. The call is routed to the wireless private branch exchange 210 connected to a central office 205 of the public switched telephone network (step 402). As illustrated by the dashed line, the user exits building 104 and leaves the area 110*a* serviced by the private wireless network 204 (step 404). The RSSI 213 detects a signal fade and requests a transfer to the public wireless network 206. The connection to the public network is executed as described above (step 406). The user continues on and enters cell 110*b* (near building 106), which is serviced by both the public network 206 and the private network 204. Upon the user's entry into the area 110*b*, the system determines whether or not the user's presence within the area 11 Ob is relatively permanent (i.e., whether the user is likely to be remaining within the building for longer than a predetermined period) (step 410). As described above, this determination is based on the WSC 222 accessing its database and providing appropriate controls signals responsive thereto.

If the user's presence is only transitory, the system will continue the call via the MTSO of the public network (step 412). If the user's presence within area 110*b* is determined to be relatively permanent, however, the call will be transferred to the private network to be serviced through the wireless private branch exchange 210 (step 416). If the user then leaves building 106 and enters the area serviced by cell 102*b* of the public network (step 418), the call will be transferred to the MTSO 208 of the public network (step 422).

If, in step 412, the user continues into cell 102*b*, serviced by the public wireless network (step 420), the call continues to be serviced by the public network (step 424). The user in either case continues on into area 110*c*, serviced by the private wireless network (step 426). Again, a determination is made whether or not the user's presence is relatively permanent or transitory (step 428). If the user's presence is determined to be only transitory (i.e., less than a predetermined period), then the call continues to be processed by the public wireless network (step 430). If, however, the user's presence is determined to be relatively permanent, then the call is processed by the private network (step 432).

The invention described in the above detailed description is not intended to be limited to the specific form set forth herein, but on the contrary, it is intended to cover such alternatives, modifications, and equivalents as can reasonably be included within the spirit and scope of the appended claims. For example, while illustrated with respect to a private wireless network and a public wireless network, the invention is equally applicable to more than one public network.

We claim:

1. A method for switching a call connection between independent wireless networks, comprising:
   servicing a call on a wireless communication device via a first independent wireless network;
   detecting entry of said wireless communication device into a region of operation of a second independent wireless network, said region comprising a region of overlap with said first independent wireless network;
   predicting, based on past patterns of use, whether said wireless communication device is likely to remain in said region of operation of said second independent wireless network for longer than a predetermined period; and
   transferring service of said call to said second independent wireless network if said wireless communication device is predicted to remain in said region of operation of said second independent wireless network for longer than said predetermined period.

2. The method of claim 1, wherein said detecting comprises a controller in said second wireless network monitoring said region for registered users.

3. The method of claim 1, wherein said predicting comprises storing a database comprising time and location records of said wireless communication device and comparing a current time and location of said wireless communication device with said time and location records.

4. The method of claim 3, wherein said storing a database comprises manually entering a predicted schedule of time and location records.

5. A method for controlling the hand-off of a wireless communication device between a plurality of independent wireless communication networks comprising:
   compiling a database of past time-location associations of said wireless communication device within a predetermined overlapping region serviced by at least two of said plurality of independent wireless communication networks;
   detecting when said wireless communication device is located within said predetermined overlapping region during an active connection;
   predicting, responsive to said detecting, a future location of said wireless communication device within said independent wireless communication networks, wherein said predicting uses said database of time-location associations;

transferring, based on a result of said predicting, said active connection between said one of said plurality of independent wireless communication networks to another of said plurality of independent wireless communication networks when said wireless communication device is detected as being within said predetermined overlapping region, wherein said predicting comprises using said time-location associations to determine a predetermined waiting period and, if said wireless communication device remains within said predetermined overlapping region for longer than said predetermined waiting period, transferring said active connection.

6. A method for switching a call connection between independent wireless networks, comprising:

servicing a call on a wireless communication device via a first independent wireless network;

detecting entry of said wireless communication device into a region of operation of a second independent wireless network;

predicting, based on past patterns of use, whether said wireless communication device is likely to remain in said region of operation of said second independent wireless network for longer than a predetermined period; and transferring service of said call to said second independent wireless network if said wireless communication device is predicted to remain in said region of operation of said second independent wireless network for longer than said predetermined period.

7. The method of claim 6, wherein said detecting comprises a controller in said second wireless network monitoring said region for registered users.

8. The method of claim 7, wherein said predicting comprises using said time-location associations to determine a predetermined waiting period and, if said wireless communication device remains within said predetermined overlapping region for longer than said predetermined waiting period, transferring said active connection.

9. The method of claim 6, wherein said predicting comprises storing a database comprising time and location records of said wireless communication device and comparing a current time and location of said wireless communication device with said time and location records.

10. The method of claim 9, wherein said storing a database comprises manually entering a predicted schedule of time and location records.

11. A method for controlling the hand-off of a wireless communication device between a plurality of independent wireless communication networks comprising:

compiling a database of past time-location associations of said wireless communication device within a predetermined overlapping region serviced by at least two of said plurality of independent wireless communication networks;

detecting when said wireless communication device is located within said predetermined overlapping region during an active connection;

predicting, responsive to said detecting, a future location of said wireless communication device, wherein said predicting uses said database of time-location associations;

transferring, based on a result of said predicting, said active connection between said one of said plurality of independent wireless communication networks to another of said plurality of independent wireless communication networks when said wireless communication device is detected as being within said predetermined overlapping region.

* * * * *